July 20, 1954 R. ADLER 2,684,404

FREQUENCY CONTROLLABLE OSCILLATING SYSTEM

Filed Jan. 23, 1952 4 Sheets-Sheet 1

INVENTOR:
ROBERT ADLER
BY Francis W. Crotty
HIS ATTORNEY.

July 20, 1954 R. ADLER 2,684,404

FREQUENCY CONTROLLABLE OSCILLATING SYSTEM

Filed Jan. 23, 1952 4 Sheets-Sheet 2

INVENTOR:
ROBERT ADLER
BY Francis W. Crotty
HIS ATTORNEY.

INVENTOR:
ROBERT ADLER
BY Francis W. Crotty
HIS ATTORNEY.

INVENTOR:
ROBERT ADLER
BY Francis W. Crotty
HIS ATTORNEY.

Patented July 20, 1954 2,684,404

UNITED STATES PATENT OFFICE 2,684,404

FREQUENCY CONTROLLABLE OSCILLATING SYSTEM

Robert Adler, Northfield, Ill., assignor to Zenith Radio Corporation, a corporation of Illinois Application January 23, 1952, Serial No. 267,826

25 Claims. (Cl. 178—69.5)

This invention relates to frequency controllable oscillating systems and to a synchronizing control apparatus, for use in a television receiver or the like, embodying such systems. This application is a continuation in part of copending application Serial No. 139,402, filed January 29, 1950, in the name of Robert Adler, and now abandoned, for "Synchronizing-Control Apparatus," and assigned to the present assignee.

Frequency controllable oscillating systems have been used for numerous purposes. For example, in the reception of television signals, it is necessary to insure that the scanning operations at the receiver are maintained in synchronism with those at the transmitting station. To this end, the composite television signal radiated by commercial transmitting stations contains line-frequency and field-frequency synchronizing-signal components which are utilized at the receiver to drive local line-frequency and field-frequency scanning-signal generators. It has been found particularly advantageous to provide automatic-frequency-control at the receiver for the line-frequency synchronizing system, in order to prevent loss of synchronization in the event that large noise signals may be superimposed from time to time on the composite television signal. The automatic-frequency-control system may comprise, for example, a phase-detector operated in conjunction with a reactance-tube system or other frequency-control device to insure positive synchronizing action. Customarily, separate receiver stages are provided for each of the functions of synchronizing-signal separation, phase-comparison between the incoming synchronizing signals and the locally-generated scanning signals, and frequency-control of the local scanning-signal generator. In addition, a second scanning-signal generator is customarily used to provide field-frequency scanning signals for the image-reproducing device.

It is a primary object of the present invention to provide a new and improved frequency controllable oscillating system.

It is another object of the present invention to provide a novel and improved synchronizing-control apparatus for a television receiver or the like, which combines the functions of synchronizing-signal separation and phase-comparison in a single stage.

It is a further object of the invention to provide improved synchronizing-control apparatus having a minimum number of component parts.

Still another object of the invention is to provide improved synchronizing-control apparatus which is eminently suited for performing the functions of synchronizing-signal separation, phase-comparison between incoming synchronizing signals and locally-generated scanning signals, and frequency-control of the local scanning-signal generator in a television receiver.

Yet a further object of the invention is to provide novel and improved synchronizing-control apparatus comprising a combination synchronizing-signal separator, balanced automatic-frequency-control phase-detector, and frequency-control device for controlling the frequency of the local scanning-signal generator in a television receiver.

In conventional television receivers utilizing automatic-frequency-control for the line-frequency scanning-signal generator, it is customary to use a pair of balanced diodes for comparing the phase of the incoming synchronizing-signal pulses with that of the locally-generated scanning signals. With an arrangement of this type, extraneous noise pulses occurring between adjacent synchronizing-signal pulses may contribute to the direct-voltage control signal which is applied to the frequency-control device and thereby result in false synchronization. Systems are known for gating the incoming synchronizing-signal pulses to prevent such false synchronization, but such systems have the disadvantage of requiring an additional number of circuit components and are therefore not generally used in commercial television receivers. It is, therefore, a further object of the invention to provide apparatus for performing in a single stage the functions of synchronizing-signal separation, automatic-frequency-control phase-detection, and frequency-control of the local scanning-signal generator, while at the same time providing gating for the incoming synchronizing-signal components to reduce the effect of extraneous noise pulses on receiver synchronization.

In accordance with the present invention, a new and improved frequency controllable oscillating system comprises a filter responsive to an applied periodic signal for developing a substantially sinusoidal signal wave. A clipper is coupled to the filter for converting the sinusoidal signal wave to a modified signal wave characterized by a waveform having periodic abrupt changes in slope. A differentiating device is coupled to the clipper for developing pulses of opposite polarities in response to the abrupt changes in slope of the modified signal wave, and a sensing device responsive to pulses of only one polarity is coupled to the differentiating device. Means are provided for coupling the sensing device to the filter to form a closed feedback loop for sustaining continuous oscillations in the system, and means are provided for applying a control-signal to the clipper for varying the phasing of the abrupt changes in slope of the modified signal wave to control the oscillation frequency.

In accordance with a feature of the present invention, novel and improved synchronizing-control apparatus for a television receiver or the like comprises a source of signals including periodic positive-polarity synchronizing-signal components of a predetermined nominal repetition frequency, and a scanning-signal generator for producing periodic scanning signals. A deflection-control electron-discharge system included in the apparatus comprises an electron gun for projecting a focused electron beam, an electrostatic-deflection system, and an output anode and an auxiliary anode effectively having transversely adjacent active portions, and there is provided means responsive to a signal in synchronism with the scanning-signals for producing within the electron-discharge system an alternating deflection field in a direction substantially perpendicular to the direction of electron travel to cause the beam periodically to switch from one to the other of the anodes. A phase-detector is coupled to the input-signal source and to the scanning-signal generator for comparing the relative phases of the synchronizing-signal components and the scanning signals to produce a direct-voltage control signal. The control signal from the phase-detector is applied to the electrostatic-deflection system, and an output circuit is coupled to one of the anodes and to the scanning-signal generator to maintain the generator in synchronism with the synchronizing-signal components.

In accordance with still another feature of the invention, synchronizing-control apparatus for a television receiver or the like comprises a source of signals including positive-polarity synchronizing-signal components of a predetermined nominal repetition frequency, and a scanning-signal generator for producing periodic scanning signals. An electron-discharge device included in the apparatus comprises an electron gun for projecting a focused electron beam, a control system including an accelerating electrode having an aperture followed by a control grid, a convergent electron lens for refocusing electrons passed by the control grid, and a pair of anodes respectively having active portions on opposite sides of the path of an undeflected electron beam emerging from the electron lens. The input-signal source is coupled to the control grid by circuit means having a time constant at least as long as the period of the nominal repetition frequency of the synchronizing-signal components. Deflection-control means are provided for producing within the device a deflection field in a direction substantially perpendicular to the direction of electron travel, and further means are provided for applying a signal in synchronism with the scanning signals to the deflection-control means. A pair of output circuits are respectively coupled to the anodes for developing a balanced direct-voltage control signal, and a frequency-control device is coupled to the scanning-signal generator for controlling the frequency of the scanning signals in accordance with the control signal.

The features of the present invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

In the preferred embodiment of the present invention, a special electron-discharge device comprising two electrode systems, having a number of component parts in common with each other and effectively defining two independent electron-discharge paths, and supported within an evacuated envelope, is particularly useful. For convenience in explaining the operation of the invention, the two electrode systems are separately illustrated in cross-section in Figures 1 and 2 respectively.

Figure 1:
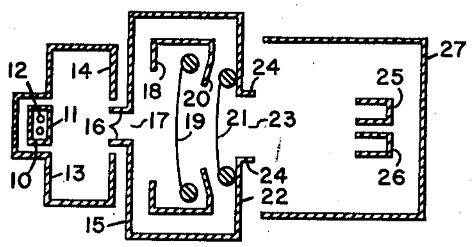
Figures 1 and 2 are different cross-sectional views of an electron-discharge device which is useful in apparatus constructed in accordance with the present invention.

In Figure 1, the first electrode system of a special discharge device or tube comprises a cathode 10 having a substantially planar emitting surface 11 and provided with a heater element 12. An auxiliary electrode 13 having portions substantially coplanar with emitting surface 11, is arranged to restrict electron emission from cathode 10 to a single general direction. A focusing electrode 14, which may for convenience be constructed integrally with auxiliary electrode 13, is also provided, and a first accelerating electrode 15 is provided with a pair of opposed lips 16 extending toward cathode 10 and terminating at a distance from those boundaries of focusing electrode 14 nearest cathode 10 which does not exceed a small fraction of the width of the aperture 17 defined by lips 16. Cathode 10, auxiliary electrode 13, focusing electrode 14, and first accelerating electrode 15 constitute an electron gun which is constructed in accordance with the copending application of Robert Adler, Serial No. 68,285, filed December 30, 1948, for "Electron-Discharge Devices of the Focused-Beam Type," now U. S. Patent 2,559,037, issued July 3, 1951, and assigned to the present assignee.

Following the aperture 17 of first accelerating electrode 15, there are disposed in the order named a second focusing electrode 18, a control grid 19, a third focusing electrode 20, and a second accelerating electrode comprising a screen grid 21 and a beam-directing portion 22 having an aperture 23 defined by a pair of opposed lips 24 extending in a direction away from the electron gun. Control grid 19 is preferably spaced from first accelerating electrode 15 by a distance greater than the smallest transverse dimension of aperture 17. Consequently, accelerating electrode 15, and control grid 19 comprise a high-transconductance intensity-control system as disclosed and claimed in the copending application of Robert Adler, Serial No. 7,864, filed February 12, 1948, for "Electron-Discharge Devices," now U. S. Patent 2,511,143, issued June 13, 1950, and assigned to the same assignee as the present application.

Third focusing electrode 20 and screen grid 21 constitute a convergent electron lens for refocusing electrons passed by control grid 19; this arrangement is identical with that described in the above-mentioned copending application Serial No. 68,285.

A pair of anodes 25 and 26, respectively having active portions on opposite sides of the path of an undeflected electron beam emerging from the electron lens comprising focusing electrode 20 and screen grid 21, are provided, and an additional anode 27 is positioned beyond anodes 25 and 26 to collect space electrons passing those anodes. Alternatively, anode 27 may be positioned between aperture 23 and anodes 25 and 26 and apertured to permit access of space electrons to those anodes.

While it is within the scope of the present invention to utilize a structure for producing a focused pencil-like beam of circular cross-section, it is preferred that all of the electrodes extend in a direction perpendicular to the plane of the drawing for a distance which is large relative to the width of cathode 10; with such an arrangement, a focused sheet-like electron beam of substantially rectangular cross-section is formed. The beam may be subjected to intensity-control by high-transconductance control grid 19 in the manner described in the above-identified copending applications, and the convergent electron lens following control grid 19 serves to refocus electrons passed by the control grid to project a refocused beam through aperture 23. The refocused beam emerging from the electron lens may then be subjected to deflection-control in a manner to be described in greater detail hereinafter, and the pair of anodes 25 and 26 may be utilized to derive a balanced output signal. Final anode 27, in addition to its function as a collector of space electrons not intercepted by anodes 25 and 26, may be connected to an output circuit to develop an additional useful output signal.

Anodes 25 and 26 preferably are identically constructed and positioned symmetrically with respect to the path of an undeflected electron beam emerging from the convergent electron lens. In order to suppress secondary emission from anodes 25, 26, and 27, each of these anodes is preferably provided with flanged portions extending toward the electron lens in such a manner that secondary electrons released from the active portions of these anodes are, for the most part, collected by the same anode structure whence they originate. In order to suppress secondary electron emission, it may be desirable to provide grounded elements (not shown) between anodes 25 and 26 and between these anodes and final anode 27, in a manner well known in the art.

Figure 2:
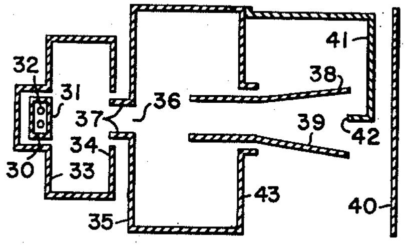

Figure 2 is a sectional view of a deflection-control electron-discharge device which may advantageously comprise an electron gun similar to that utilized in the device of Figure 1, comprising a cathode 30 having a substantially planar emitting surface 31 and provided with a heater element 32, an auxiliary electrode 33 having active portions substantially coplanar with surface 31, a focusing electrode 34, and an accelerating electrode 35 having an aperture 36 defined by a pair of opposed lips 37 extending toward cathode 30 and terminating at a distance from those boundaries of focusing electrode 34 nearest cathode 30 which is a small fraction of the width of aperture 36. A pair of electrostatic-deflection electrodes 38 and 39 are symmetrically arranged with respect to the path of the electron beam projected through aperture 36, and an output anode 40 is disposed across the path of an electron beam projected between deflection electrodes 38 and 39. An intercepting or auxiliary anode 41, having an intercepting edge 42 which is centrally disposed with respect to the path of an undeflected electron beam projected between deflection electrodes 38 and 39, and having an active portion which is effectively transversely adjacent that of output anode 40, is also provided. For structural convenience, intercepting anode 41 may be supported, as by welding or the like, by accelerating electrode 35, and a second accelerating electrode 43 may be provided for ease in combining the electrode systems of Figures 1 and 2 in a single unitary structure.

The arrangement of Figure 2 is a conventional deflection-control electron-discharge device, with the exception of the particular structure used for the electron gun. An electron beam projected through aperture 36 is deflected in accordance with a signal applied between deflection electrodes 38 and 39 so that the beam is periodically switched from output anode 40 to intercepting anode 41 and vice-versa. Thus, the output signal developed in the output circuit (not shown) associated with output anode 40 comprises essentially a square-wave voltage, in a manner well known in the art.

Figure 3:
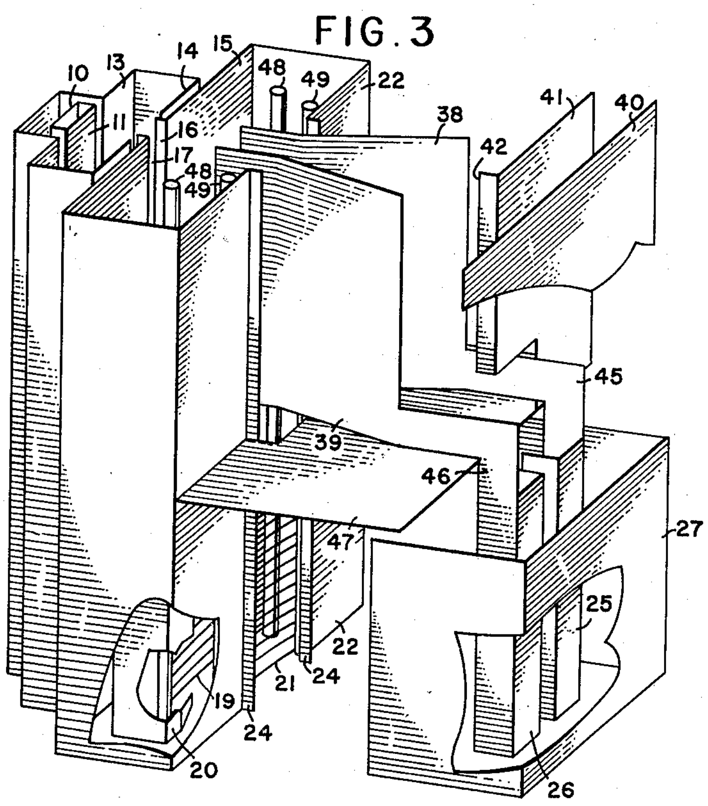
Figure 3 is a perspective view, partially cut away, of the electrode system of the novel and improved electron-discharge device shown in cross-section in Figures 1 and 2.

Figure 3 is a perspective view, partially cut away, of the electrode arrangement of a novel electron-discharge device combining the electrode systems of Figures 1 and 2 in a single unitary electrode structure. The device of Figure 3 comprises an electron gun including an elongated cathode 10 having an emissive surface 11 and an accelerating electrode 15 having a slot 17 parallel to cathode 10. A pair of electrode systems are disposed across the paths of different portions of the electron beam projected through slot 17 of first accelerating electrode 15. The lower system is similar to that shown in Figure 1 and comprises control grid 19, a convergent electron lens including focusing electrode 20 followed by screen grid 21, beam-directing member 22, and anodes 25, 26, and 27. The upper electrode system comprises electrostatic-deflection electrodes 38 and 39, as well as output anode 40 and intercepting anode 41.

Anodes 25 and 26 of the lower electrode system are electrically connected respectively to electrostatic-deflection electrodes 38 and 39 by means of connector strips 45 and 46; for ease of manufacture, each of the deflection plates and its associated anode may be formed from a single flat metal stamping which is then formed to the desired configuration.

Intercepting anode 41 is preferably welded or otherwise secured to second accelerating electrode 22 in such a manner as to form an effective shield between the two electrode systems; to this end, intercepting anode 41 comprises a shield portion 47 extending beneath the deflection electrodes 38 and 39 transversely of the tube and secured to accelerating electrode 22. Preferably, for reasons hereinafter to be made apparent, all of the electrodes following beam-directing member 22 and comprising deflection electrodes 38 and 39, output anode 40, intercepting anode 41, and anodes 25, 26, and 27, are constructed of non-magnetic material.

The complete electrode structure is supported within an envelope (not shown) by any suitable arrangement known in the art, as by means of a pair of mica spacer-discs, and the envelope is then evacuated and gettered in the usual fashion. External circuit connections are provided for cathode 10, the accelerator box comprising accelerating electrode 15 and beam-directing member 22 (to which screen grid 21 is connected), deflection electrode 38 and anode 25, deflection electrode 39 and anode 26, output anode 40, control grid 19, and final anode 27; in addition, a pair of external connections are provided for the heater element associated with cathode 10, not shown in Figure 3 to avoid confusing the drawing.

Focusing electrodes 14, 18, and 20 and auxiliary electrode 13 may conveniently be electrically connected internally to cathode 10 and thereby operated at cathode potential, and screen grid 21 may be secured to the accelerator box for operation at a common potential therewith. The support rods 48 for control grid 19 and rods 49 for screen grid 21 may be extended through the upper electrode system for mounting convenience. Optionally, the focusing electrode structure comprising second and third focusing electrodes 18 and 20 may also be extended for the full length of the electrode structure (not shown). Moreover, it may be possible to obtain satisfactory operation by omitting beam-directing member 22.

Figure 4:
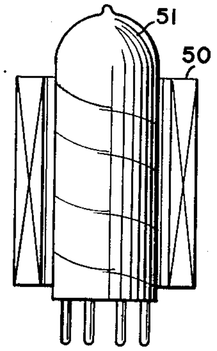
Figure 4 is a side view, partly in section, of the device of Figure 3 in cooperation with a magnetic-deflection coil.

With reference to Figure 4, a magnetic-deflection coil 50 is arranged externally of the envelope 51 in which the electrode structure of Figure 3 is supported, in order to provide a deflection field within the device in a direction substantially parallel to cathode 10, thereby providing a means for transversely deflecting the electron beam. Transverse deflection of the beam, however, may be accomplished by any other means known to the art.

The novel features of the electron-discharge systems per se shown and described in connection with Figures 1–4, are specifically claimed in the copending application of Robert Adler, Serial No. 139,401, filed January 19, 1950, now Patent No. 2,606,300, issued August 5, 1952, for "Electron-Discharge Devices," and assigned to the present assignee.

An electron-discharge device constructed in accordance with the foregoing specifications is particularly, although not exclusively, useful in synchronizing-control systems for television receivers or the like. A television receiver incorporating a synchronizing-control system utilizing the novel device and constructed in accordance with the present invention is illustrated schematically in Figure 5.

Figure 5:
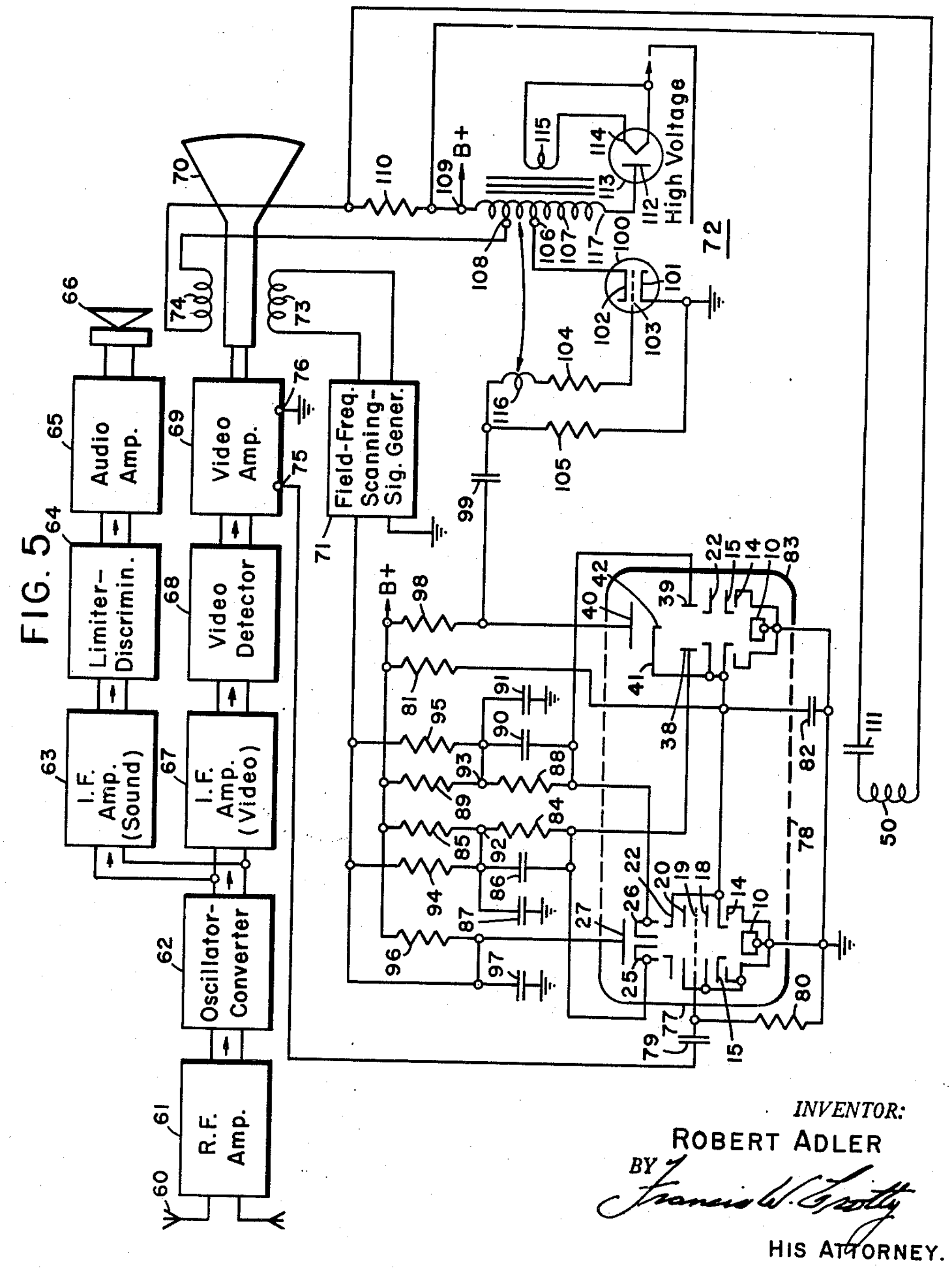
Figure 5 is a schematic circuit diagram of a television receiver embodying synchronizing-control apparatus constructed in accordance with the invention.

In Figure 5, incoming composite television signals are intercepted by an antenna 60, selected and amplified by a radio-frequency amplifier 61 comprising any desired number of stages, and applied to an oscillator-converter 62 for heterodyning with a locally generated signal. Intermediate-frequency sound signals from oscillator-converter 62 are amplified by any desired number of stages 63 of intermediate-frequency amplification, and the amplified sound signals are limited and detected by means of a limiter-discriminator 64. Audio-frequency output from limiter-discriminator 64 is amplified by means of an audio amplifier 65 and applied to a loudspeaker 66 or other sound-reproducing device.

Intermediate-frequency video signals from oscillator-converter 62 are amplified by any desired number of stages 67 of intermediate-frequency video amplification and are applied to a video-detector 68. Detected composite video signals from video detector 68 are applied to a video amplifier 69 and thence to the input circuit of a cathode-ray tube 70 or other image-reproducing device.

Alternatively, an intercarrier sound system may be used, in which event intermediate-frequency amplification of both video and sound signals may be accomplished in a single channel.

In order to insure receiver synchronization, there is also provided synchronizing-control apparatus including a field-frequency scanning-signal generator 71 and a line-frequency scanning-signal generator 72. Field-frequency scanning-signals from generator 71 and line-frequency scanning signals from generator 72 are applied to the appropriate deflection coils, 73 and 74 respectively, associated with the image-reproducing device 70.

In conventional television receivers, proper synchronization of the field-frequency and line-frequency scanning-signal generators is accomplished by means of a synchronizing chain, comprising a synchronizing-signal separator, an automatic-frequency-control phase-detector, and a reactance-tube or other frequency-control device, responsive to the synchronizing-signal components of the detected composite video signal for synchronizing the frequency and phase of the respective scanning-signal generators; in conventional receivers, these functions are accomplished by means of relatively complex circuit arrangements including at least three electron-discharge devices. These functions, however, in accordance with the present invention, may all be accomplished with a relatively simple circuit using a single electron-discharge device of the type shown and described in connection with Figures 1–4.

To this end, detected composite video signals comprising positive-polarity line-frequency and field-frequency synchronizing-signal components are applied from terminals 75 and 76 of video amplifier 69, by means of a coupling condenser 79 and a grid resistor 80, between the control grid 19 and the cathode 10 of the lower section 77 of an electron-discharge device 78 of the type shown in Figure 3. Cathode 10 is directly connected to ground, and focusing electrodes 14, 18, and 20 are internally connected to cathode 10. Accelerating electrodes 15 and 22 are connected to a suitable source of positive unidirectional operating potential, conventionally designated B+, by means of a resistor 81, and are bypassed to ground by a condenser 82. Anode 25 is connected (preferably internally) to deflection electrode 38 of the upper section 83 of device 78 and is also connected to B+ through a pair of serially connected resistors 84 and 85; a condenser 86 is connected in parallel with resistor 84, and another condenser 87 is connected between the junction 92 of resistors 84 and 85 and ground. Similarly, anode 26 is connected (preferably internally) to deflection electrode 39 and is also connected to B+ through a pair of serially connected resistors 88 and 89; a condenser 90 is connected in parallel with resistor 88, and another condenser 91 is connected between the junction 93 of resistors 88 and 89 and ground. Junctions 92 and 93 are connected to final anode 27 by means of resistors 94 and 95 respectively. Final anode 27 is connected to B+ through an output load resistor 96 and is coupled to field-frequency scanning-signal generator 71; an integrating condenser 97 is connected between final anode 27 and ground.

In the upper section 83 of device 78, intercepting anode 41 is internally connected to accelerating electrodes 15 and 22. Output anode 40 is connected through an output load resistor 98 to B+ and is coupled to line-frequency scanning-signal generator 72 by means of a differentiating network including a coupling condenser 99 and an input resistor 105.

Line-frequency scanning-signal generator 72 may conveniently comprise a bidirectional electron-discharge device 100, constructed in accordance with the copending application of Robert Adler, Serial No. 129,554, filed November 26, 1949, for "Electron-Discharge Device and Circuits," and assigned to the present assignee. Such a device comprises a pair of thermionic cathodes 101 and 102 with a control grid 103 intermediate the cathodes to control electron space current flow within the device. One of the cathodes 101 is directly connected to ground, and control grid 103 is coupled to cathode 101 by means of a series input circuit comprising a current-limiting resistor 104, a feedback coil 116 inductively coupled to coil 107, and input resistor 105. The other cathode 102 is connected to a tap 106 on an output inductor 107, and one terminal 109 of coil 107 is connected to B+. Line-frequency deflection coil 74 associated with image-reproducing device 70 is coupled between terminal 109 of coil 107 and a second tap 108 on that coil intermediate tap 106 and B+, and a small resistor 110 is included in series with deflection coil 74. The voltage developed across resistor 110 is applied to the series combination of magnetic-deflection coil 50 associated with device 78 and a tuning and phasing condenser 111 adjusted to resonate with coil 50 at the line-frequency.

Briefly, the operation of line-frequency scanning-signal generator 72 is as follows: At the beginning of each scanning-cycle, cathode 102 is at a lower potential than grounded cathode 101, and negative current flows through the output coil 107. The potential of cathode 102 rises uniformly at a rate determined by the ratio of the supply voltage to the inductance of the portion of coil 107 between B+ and tap 106 until, slightly before the middle of the scanning-cycle, the potential of cathode 102 becomes positive with respect to ground. Current-flow in device 100 is then reversed, and the potential of cathode 102 continues to rise at the same rate until a negative-polarity pulse is applied to the input circuit to render device 100 non-conductive. During the non-conductive period, a large positive-polarity pulse is produced between cathode 102 and ground. Feedback coil 116 operates to apply a proportional negative-polarity pulse to the input circuit, thereby effectively reducing the required amplitude of the trigger pulse.

If the feedback voltage ratio between tickler-coil 116 and output coil 107 is made materially greater than the reciprocal of the effective transconductance of control grid 103 with respect to ungrounded cathode 102, the circuit becomes self-sustaining, and trigger pulses of reduced amplitude and duration may be used to synchronize the scanning-signal generator. Such a self-sustaining arrangement is disclosed and claimed in the copending application of Jack E. Bridges, Serial No. 129,671, filed November 26, 1949, for Self-Sustaining Sawtooth Current Generators, now Patent No. 2,591,914, issued April 8, 1952, and assigned to the same assignee as the present application.

In order to provide high voltage for operating image-reproducing device 70, the second terminal 117 of coil 107 is connected to the anode 112 of a rectifier device 113, the filament 114 of which may be energized by means of a secondary winding 115 inductively coupled to output coil 107 in a manner well known in the art.

In operation, detected composite video signals, comprising positive-polarity line-frequency and field-frequency synchronizing-signal pulses, are applied to the control grid circuit of the lower section 77 of device 78 by circuit means comprising coupling condenser 79 and grid resistor 80. In order to provide synchronizing-signal slicing, or double clipping, the time-constant of the input circuit comprising condenser 79 and resistor 80 is preferably made at least as long as the period of the field-frequency. Since the control characteristic of control grid 19 is of the form of a step function, comprising two input-voltage ranges of substantially zero transconductance separated by an input-voltage range of high transconductance, the control grid 19 allows the lower portion of the sheet-like electron beam to pass only when the control grid potential is more positive than a predetermined minimum; in other words, control grid 19 operates as a beam gate. With an input circuit of an appropriate time-constant, grid 19 is self-biased by the flow of grid current during synchronizing-signal pulse intervals. Because the grid current characteristic is limited as a result of the construction of the control system comprising accelerating electrode 15 and control grid 19, only intermediate portions of the synchronizing-signal pulses are reproduced in the electron beam passed by control grid 19. This operation is explained in detail in the copending application of Erwin M. Roschke et al., Serial No. 94,642, filed May 21, 1949, for "Signal-Slicing Circuits," and assigned to the present assignee.

If it is now assumed that the signal applied to magnetic-deflection coil 50 associated with device 78 is so phased as to pass through zero at exactly the instants when the line-frequency synchronizing-signal pulses occur, the beam passed by control grid 19 during line-frequency synchronizing-signal pulse intervals is undeflected and is divided equally between anodes 25 and 26; consequently, the output voltages developed in the respective output circuits associated with anodes 25 and 26 are equal when the magnetic scanning-signal is properly phased with respect to the incoming line-frequency synchronizing-signal pulses.

At the same time, the portion of the sheet-like beam projected from the electron gun in the upper section 83 of device 78 is periodically deflected in a lateral direction due to the alternating magnetic deflection field set up by coil 50. Thus, a negative pulse is developed across resistor 105 each time the beam is switched from intercepting anode 41 to output anode 40, and a positive pulse is developed across resistor 105 each time the beam on its return swing is switched from output anode 40 to intercepting anode 41. If, as already assumed, the deflection signal applied to coil 50 is so phased as to pass through zero at exactly the instants when the line-frequency synchronizing-signal pulses occur, and if the coil 50 is so oriented with respect to device 78 as to switch the electron beam in the upper section from intercepting anode 41 to output anode 40 at these instants, negative polarity pulses are produced across resistor 105 in synchronism with the line-frequency synchronizing signal pulses. These sharp potential drops are utilized to trigger the line-frequency scanning-signal generator 72 and for this purpose are coupled to the input circuit of device 100 by means of condenser 99 and resistor 105 which are of such respective magnitudes as to provide a time constant which is short relative to the period of the line-frequency, thereby to provide a differentiating action.

If the deflection signal across coil 50 is not properly phased with respect to the incoming line-frequency synchronizing-signal pulses, the phase of the output signal appearing across resistor 98 is automatically shifted by an amount proportional to the deviation from synchronism and in a direction to restore synchronism.

For example, the incoming line-frequency synchronizing-signal pulses may instantaneously lag the deflection signal applied to coil 50. If it is assumed that the polarity of the signal applied to coil 50 is such as to cause the sheet-like beam of device 78 to switch from intercepting anode 41 to output anode 40 (i. e. if the deflection signal swings through zero at approximately the moment when the line-frequency synchronizing-signal pulse is expected), a larger portion of the beam passed by control grid 19 during the synchronizing-pulse interval is collected by anode 26 than by anode 25. Consequently, the potential of anode 26 is decreased relative to that of anode 25. As a result, the electrostatic deflection-field set up between deflection electrodes 38 and 39, which are direct-coupled to anodes 25 and 26 respectively, opposes the magnetic deflection-field established by coil 50 and retards the lateral deflection from left to right of the beam in the upper section 83 of device 78. Therefore, during the cycle under consideration, the switching of the beam from intercepting anode 41 to output anode 40 is retarded, and the negative-polarity pulse developed across resistor 105 is maintained in phase with the incoming line-frequency synchronizing-signal pulse.

On the other hand, if the line-frequency synchronizing-signal pulses instantaneously lead the deflection signal applied to coil 50, the potential of anode 25 is reduced relative to that of anode 26, and the electrostatic-deflection field set up between deflection electrodes 38 and 39 is in such a direction as to aid the lateral deflection of the beam in the upper section 83 and advance the negative-polarity pulse appearing across resistor 105. Thus, phase deviations of the deflection signal applied to coil 50 relative to the incoming line-frequency synchronizing-signal pulses are compensated.

Thus, the lower section 77 of device 78 effectively performs the functions of synchronizing-signal separation and balanced automatic-frequency-control phase-detection. Any deviation from exact phase synchronism between the incoming line-frequency synchronizing-signal pulses and the scanning signals developed by generator 72 is reflected in an unbalance between the potentials of anodes 25 and 26. This potential unbalance is transferred by direct-coupling to electrostatic-deflection electrodes 38 and 39 in such a sense as to advance or retard the negative-polarity output pulses appearing across resistor 105 by an amount just sufficient to compensate for the original phase difference. Consequently, the line-frequency scanning-signal generator 72 is triggered at exactly the proper moment to maintain the receiver scanning in synchronism with that at the transmitter.

In order to prevent loss of synchronization and "tearing out" in the event that the incoming line-frequency synchronizing-signal pulses are momentarily over-ridden by extraneous noise signals, the output circuits associated with anodes 25 and 26, comprising resistor 85 and condenser 87 in the one instance and resistor 89 and condenser 91 in the other, are each chosen to provide a time constant of several line intervals; for example, the time constant may be chosen to be approximately equal to 100 line intervals. As in conventional automatic-frequency-control arrangements, however, the integrating action of the output circuits must be restricted sufficiently to enable the line-frequency scanning-signal generator initially to lock in with the incoming line-frequency synchronizing-signal pulses when the receiver is first set into operation.

Condensers 86 and 90 are provided to bypass alternating components of the balanced direct-voltage control signal applied between deflection electrodes 38 and 39; alternatively, a single condenser (not shown) may be connected between deflection electrodes 38 and 39 for this purpose. Because the balanced automatic-frequency-control signal is utilized by applying it between a pair of electrostatic-deflection electrodes, this signal may be direct-coupled to the deflection plates; no blocking condensers are needed because a balanced electrostatic-deflection system operates most efficiently when equal positive biasing voltages are applied to the electrostatic-deflection electrodes.

Since the time constant of the input circuit comprising condenser 79 and resistor 80 is made at least as long as the period of the field-frequency, field-frequency synchronizing-signal pulses are also subjected to a slicing action, and intermediate portions of these pulses produce constant-amplitude negative-polarity pulses across output load resistor 96. These pulses may be integrated by means of condenser 97 and applied to field-frequency scanning-signal generator 71 to maintain proper field-frequency scanning synchronism of the receiver with respect to the transmitter. It is noted that two portions of each line interval of the field-frequency synchronizing-signal pulses are not reproduced in the output signal developed across resistor 96 because the beam is momentarily intercepted by anodes 25 and 26 as it is swept across these anodes by magnetic deflection coil 50. By making anodes 25 and 26 symmetrical with respect to the path of the undeflected electron beam passed by control grid 19, it is insured that these discontinuities in the field-frequency output pulses will have no adverse affect upon the receiver scanning interlace. However, in the system of Figure 5, discontinuities in the field-frequency pulses used to drive field-frequency scanning signal generator 71 are avoided by means of resistors 94 and 95 which are connected in such a manner as effectively to add the outputs of anodes 25 and 26 to that of anode 27 to obtain the field-frequency output pulses.

It is also possible to obtain field-frequency output pulses directly from the balanced control signal anodes by making these anodes of sufficient lateral extent to accommodate the entire lateral deflection of the beam by the deflection signal applied to coil 50, as described and claimed in the copending application of Robert Adler, Serial No. 260,221, filed December 6, 1951, for "Synchronizing-Control Apparatus" and assigned to the present assignee. Such an arrangement obviates the requirement for a separate collector anode; however, it is preferred to use the additional anode in conjunction with narrow control signal anodes because of the noise gating obtained thereby in a manner to be hereinafter explained.

With the output current from line-frequency scanning-signal generator 72 providing the magnetic deflection for the upper section 83 of device 78, and with the output anode 40 of that section providing trigger pulses for the line-frequency scanning-signal generator 72, a feedback loop is established for providing self-sustaining scanning-signal oscillations. Consequently, scanning-signal generator 72 may be either of the self-sustaining type disclosed and claimed in the Bridges application or of the non-self-sustaining type disclosed and claimed in Adler application Serial No. 129,554. Preferably, however, to insure the start of oscillation around the feedback loop, generator 72 is of the self-sustaining variety.

It is also possible to utilize a conventional discharge-tube scanning-signal generator in conjunction with the synchronizing-control apparatus incorporating device 78; however, when such a conventional discharge-tube generator is used, the direction of the magnetic field produced by coil 50 must be reversed since positive-polarity pulses are required to trigger the scanning-signal generator.

In the illustrated embodiment, it is convenient to provide lateral deflection of the sheet-like electron beam by using an external magnetic-deflection coil 50 which is responsive to the line-frequency scanning signals to operate as a deflection-control device. Consequently, in order to obtain the maximum magnetic deflection for a given field strength, it is preferred to construct all of the electrodes folowing the second accelerating electrode 22 of non-magnetic material. The material of which the electron gun and the intensity-control system are constructed may be either magnetic or non-magnetic, since deflection in this portion of the device is relatively unimportant.

While the system of Figure 5 utilizes a tapped portion of the output signal from the scanning-signal generator 72 to drive the deflection-control device 50, it is apparent that any other signal in synchronism with the line-frequency scanning signals may be used for this purpose. In practice, a deflection field of the order of 10 gauss is required to provide sufficient lateral deflection of the electron beam; this corresponds to less than 1% of the energy used by the line-frequency deflection coils 74 in the yoke associated with image-reproducing device 70.

Thus, synchronizing-control apparatus constructed in accordance with the present invention affords great advantage in a television receiver. The functions of synchronizing-signal separation, automatic-frequency control phase-detection, and frequency-control of the line-frequency scanning-signal generator are all accomplished with a single stage comprising a single electron-discharge device and a minimum number of associated circuit components.

In addition, there is a further advantage afforded by the use of the system of Figure 5. While the control grid 19 operates to pass selected intermediate portions of the incoming synchronizing-signal pulses, extraneous noise pulses of sufficient amplitude to extend into the blacker-than-black region between adjacent synchronizing-signal pulses are also passed. However, these extraneous noise signals do not contribute materially to the output of the balanced phase-detector, since electrons passed by control grid 19 during intervals between adjacent synchronizing-signal pulses are all collected by collector anode 27 except during two small portions of each line-frequency cycle, due to the action of deflection-control device 50. Consequently, a substantial amount of noise gating is accomplished in addition to the other functions listed; while it is known to provide gating per se, this function has always been accomplished in prior art receivers at the expense of an additional number of circuit components.

Figure 6:
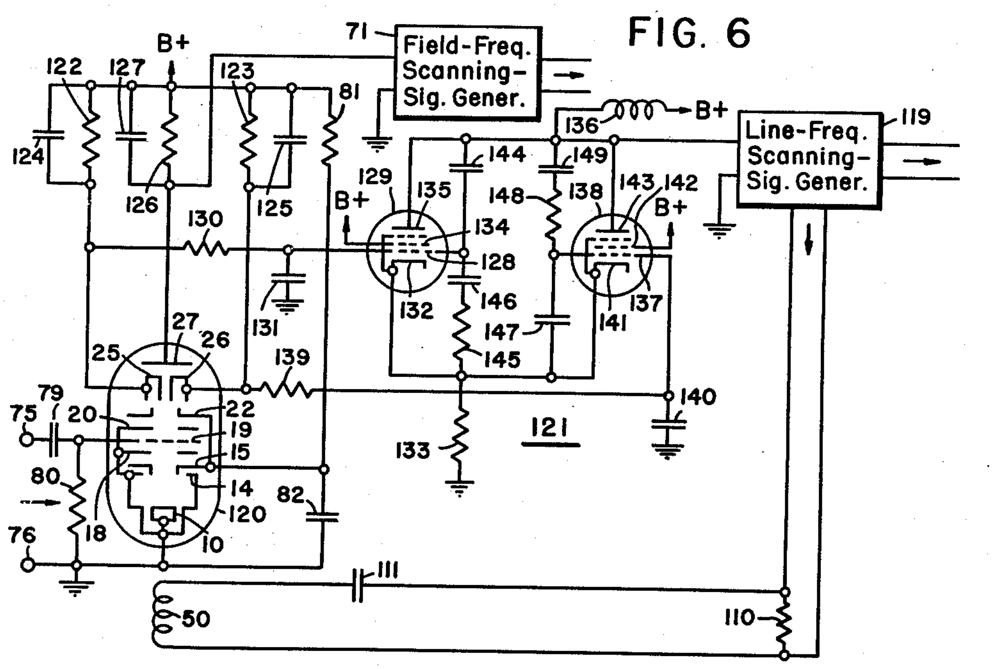
Figures 6 and 7 are schematic circuit diagrams of other arrangements embodying the invention.

While it is preferred to utilize a structure of the type shown in Figure 3 as a synchronizing-control device in a television receiver, the lower section of the device, shown in cross-section in Figure 1, is also new and useful in itself. An arrangement constructed in accordance with the invention and utilizing an electron-discharge device of this type is illustrated in Figure 6, which is a schematic representation of the synchronizing chain of a television receiver. The arrangement comprises an electron-discharge device 120 of the type shown in cross-section in Figure 1 in combination with a push-pull reactance-tube system 121, a field-frequency scanning-signal generator 71, and a line-frequency scanning-signal generator 119 of conventional construction. Terminal 75 of video amplifier 69 (Figure 5) is coupled to control grid 19 by means of a coupling condenser 79, and terminal 76 of video amplifier 69 is directly connected to the grounded cathode 10. A grid resistor 80 is connected between control grid 18 and ground. Accelerating electrodes 15 and 22 are connected to B+ through a resistor 81 and are bypassed to ground by means of a condenser 82.

Separate output circuits are provided for anodes 25, 26, and 27. The output circuits for anodes 25 and 26 are balanced and comprise resistors 122 and 123 respectively; condensers 124 and 125 are respectively connected in parallel with resistors 122 and 123. Collector anode 27 is coupled to B+ through an output circuit comprising the parallel combination of a resistor 126 and a condenser 127, and anode 27 is direct-coupled to field-frequency scanning-signal generator 71.

Anode 25 is coupled to the control grid 128 of an electron-discharge device 129 by means of an integrating network comprising a series resistor 130 and a shunt condenser 131. The cathode 132 of device 129 is connected to ground through a resistor 133 and the screen grid 134 of device 129 is directly connected to B+. The anode 135 of device 129 is coupled to B+ through a choke coil 136.

Anode 26 of device 120 is coupled to the control grid 137 of another electron-discharge device 138 by means of an integrating network comprising a series resistor 139 and a shunt condenser 140. The cathode 141 of device 138 is connected to cathode 132 of device 129, and the screen grid 142 of device 138 is directly connected to B+. The anode 143 of device 138 is connected to B+ through choke coil 136.

In order to provide balanced reactance-tube operation of devices 129 and 138 in response to the balanced direct-voltage control signal appearing between anodes 25 and 26, a condenser 144 is connected between the anode 135 and the control grid 128 of device 129, and the series combination of a resistor 145 and a blocking condenser 146 is connected between control grid 128 and cathode 132. Similarly a condenser 147 is connected between control grid 137 and cathode 141 of device 138, and the series combination of a resistor 148 and a blocking condenser 149 is coupled between anode 143 and control grid 137. Anodes 135 and 143 are coupled to line-frequency scanning-signal generator 119.

Line-frequency scanning signals developed by generator 119 are applied to the line-frequency deflection coil associated with the image-reproducing device (not shown), and a portion of the line-frequency scanning signals is tapped out by means of a small resistor 110 and applied to the series combination of deflection-control device 50 and tuning and phasing condenser 111.

The operation of electron-discharge device 120 and its associated circuit components is similar in all essential respects to that of the lower section of device 78 in the system of Figure 5. Thus, field-frequency pulses are developed across resistor 126 and are applied to field-frequency scanning-signal generator 71 after integration by means of condenser 127. In addition, output signals are developed at anodes 25 and 26, and these output signals are equal whenever the line-frequency scanning-signal generator 119 is properly phased with respect to the incoming line-frequency synchronizing-signal pulses. However, a balanced direct-voltage control signal appears between anodes 25 and 26 whenever the line-frequency scanning-signal generator 119 falls out of step with the incoming synchronizing-signal pulses.

Devices 129 and 138 and their associated circuit components function as a balanced or push-pull reactance-tube system for utilizing the control signal developed between anodes 25 and 26 to maintain the line-frequency scanning-signal generator 119 in phase with the line-frequency synchronizing-signal pulses appearing between terminals 75 and 76. When the system is balanced, device 129 operates as an inductive reactance, and device 138 as a capacitance reactance equal in magnitude and opposite in phase to the effective reactance of device 129. Consequently, when the scanning-signal generator is properly synchronized, the net output from reactance-tube system 121 is zero. However, when a condition of unbalance exists, a net inductive or capacitive effect is produced by system 121 of proper magnitude and sense to restore synchronism of the scanning-signal generator.

Figure 7:
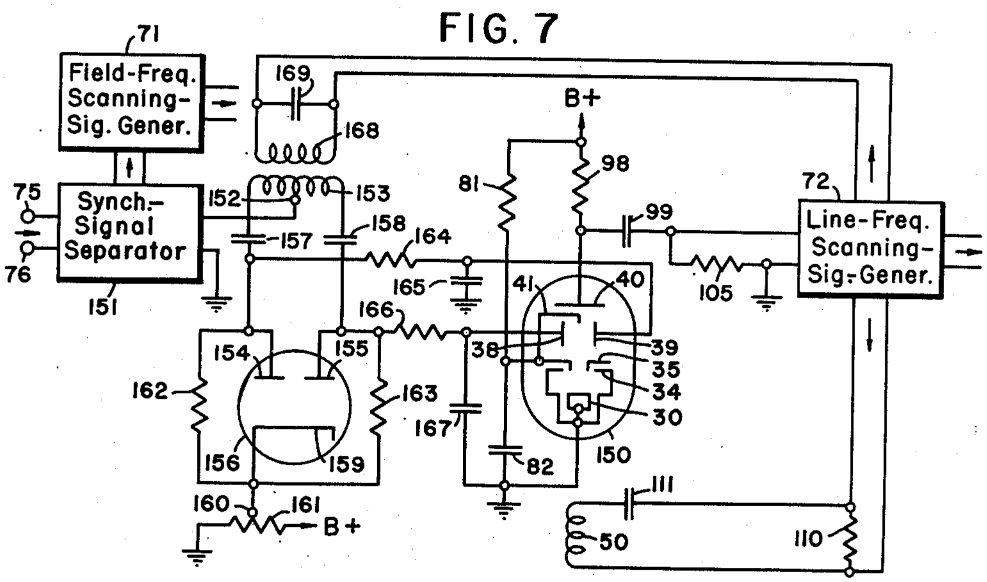

In a further embodiment of the invention, shown in Figure 7, synchronizing-signal separation and automatic-frequency control phase-detection are accomplished by using conventional devices, whereas the frequency-control of the line-frequency scanning-signal generator is accomplished by the use of a device 150 of the general type shown in cross-section in Figure 2.

Terminals 75 and 76 of video-amplifier 69 (Figure 5) are coupled to a synchronizing-signal separator 151 which may be of conventional construction. Field-frequency synchronizing-signal pulses from synchronizing-signal separator 151 are applied to the field-frequency scanning-signal generator 71, and the output scanning signals from generator 71 are impressed upon the field-frequency deflection coils (not shown) associated with the image-reproducing device.

Line-frequency synchronizing-signal pulses from synchronizing-signal separator 151 are applied to a center tap 152 on a coil 153, the terminals of which are respectively connected to the anodes 154 and 155 of a double-diode rectifier device 156 by means of blocking condensers 157 and 158. The cathode 159 of device 156 is connected to a tap 160 on a bleeder resistor 161 connected between B+ and ground. Balanced load resistors 162 and 163 are connected respectively from anode 154 and from anode 155 to cathode 159.

Anode 154 of device 156 is coupled to deflection electrode 39 of device 150 by means of an integrating network comprising a series resistor 164 and a shunt condenser 165. Similarly, anode 155 of device 156 is coupled to deflection electrode 38 of device 150 by means of a series resistor 166 and a shunt condenser 167. The cathode 30 of device 150 is grounded and accelerating electrode 35 is connected to B+ through a resistor 81 and to ground through a condenser 82. Intercepting anode 41 is connected to accelerating electrode 35, and output anode 40 is connected to B+ through a load resistor 98. Output anode 40 is also coupled to the line-frequency scanning-signal generator 72 by means of a differentiating network comprising a coupling condenser 99 and an input resistor 105.

Line-frequency scanning signals, or a signal in synchronism therewith, are applied from generator 72 to a parallel-resonant circuit comprising an inductor 168 and a condenser 169, and inductor 168 is inductively coupled to coil 153. Line-frequency scanning signals are also tapped from a small resistor 110 and applied to the series combination of deflection-control device 50 and tuning and phasing condenser 111 to provide periodic lateral deflection of the electron beam within device 150. Line-frequency scanning signals from generator 72 are applied to the line-frequency deflection coil (not shown) associated with the image-reproducing device.

In operation, device 156 and its associated circuit components comprise a balanced automatic-frequency-control phase-detector for comparing the phase of the line-frequency synchronizing-signal pulses with that of the line-frequency scanning signals impressed across coil 168. For a condition of balance, representing exact phase synchronism, the direct-voltage signals appearing across resistors 162 and 163 are equal, and therefore no direct-voltage control potential difference appears between electrostatic-deflection electrodes 38 and 39 of device 150. The beam within device 150 is periodically deflected in a lateral direction in response to the alternating magnetic field established by magnetic-deflection coil 50 within device 150, so that periodic output pulses appear across resistor 98 as explained in connection with Figure 5. These pulses are differentiated by condenser 99 and resistor 105 and are used to trigger the line-frequency scanning-signal generator 72. Either positive-polarity or negative-polarity output pulses may be used to trigger the scanning-signal generator depending on the construction of the generator; for some conventional scanning-signal generators, positive trigger pulses are required, whereas negative trigger pulses may be used to drive a scanning generator of the type illustrated in Figure 5. The polarity of the output pulses in synchronism with the line-frequency synchronizing-signal pulses is determined by the orientation of coil 50 with respect to device 150; the polarity may be reversed by interchanging the terminal connections of coil 50.

In the embodiment of Figure 7, it is also possible to provide periodic lateral deflection of the electron beam within device 150 by applying a sinusoidal signal in synchronism with the line-frequency scanning signals between deflection electrodes 38 and 39, thereby obviating the requirement for an external magnetic deflection coil. All that is essential is that a deflection field be established within device 150 in a direction perpendicular to the direction of electron travel, thereby to provide periodic lateral deflection of the beam and periodically to switch the beam from intercepting anode 41 to output anode 40 and vice-versa.

In the embodiments of Figures 5 and 7, trigger pulses for driving the line-frequency scanning-signal generator are derived from an output circuit coupled to output anode 40, and intercepting anode 41 is operated at the same potential as the accelerating electrodes. However, it is apparent that intercepting anode 41 may be maintained electrically independent of the accelerating electrodes, if desired, so that output pulses of polarity opposite to that of the pulses appearing across resistor 105 may be provided across a differentiating load circuit coupled to intercepting anode 41 (not shown).

The novel synchronizing-control apparatus of the preferred embodiment of Figure 5 provides numerous advantages of simplicity and economy by employing a novel type of frequency controllable oscillating system. In its simplest form, such an oscillating system is illustrated in the block diagram of Figure 8 and comprises a filter 180, a clipper 181, a differentiating device 182, and a rectifier 183 or other sensing device responsive to pulses of one polarity only, all connected in a closed feedback loop having a loop voltage gain of at least unity to sustain continuous oscillations in the system. Filter 180 develops a substantially sinusoidal signal wave which is modified by clipper 181 to form a rectangular wave or other modified signal wave characterized by a waveform having periodic abrupt changes in slope. Pulses of opposite polarities are developed in response to such abrupt changes in slope by differentiating device 182, and pulses of only one polarity are effectively selected by sensing device 183 to provide a periodic output signal which in turn is fed back to filter 180 to close the feedback loop. An amplifier stage (not shown) may be provided to insure a loop voltage gain of at least unity so as to sustain the system in continuous oscillation, although it is preferred that elements 181–183 be so designed, in a well-known manner, as to provide sufficient voltage gain in addition to performing their characteristic functions. A control-signal source 184 is coupled to clipper 181 for varying the phase of the abrupt changes in slope of the modified signal wave appearing at the output of clipper 181 with reference to the phase of the applied input signal, thereby to control the frequency of oscillation. The control signal from source 184 may be a unidirectional signal, as in the case of an automatic-frequency-control system, or an intelligence signal, as in the case of a frequency modulator.

Specifically, the counterparts of elements 180 through 184 of Figure 8 may be identified in the preferred embodiment of Figure 5 as follows. Inductor 50 and condenser 111 constitute a passive oscillatory circuit or ringing circuit which serves as filter 180. Clipper 181 comprises the upper section 83 of synchronizing-control tube 78, wherein the sinusoidal signal wave across inductor 50 is converted to a rectangular wave at output anode 40. Condenser 99 and resistor 105 constitute differentiating device 182, and line-frequency sweep-signal generator 72 is a sensing device 183 which is responsive to pulses of negative polarity only. Phase-detector anodes 25 and 26 in the lower section 77 of device 78 serve as control-signal source 184.

Figure 8:
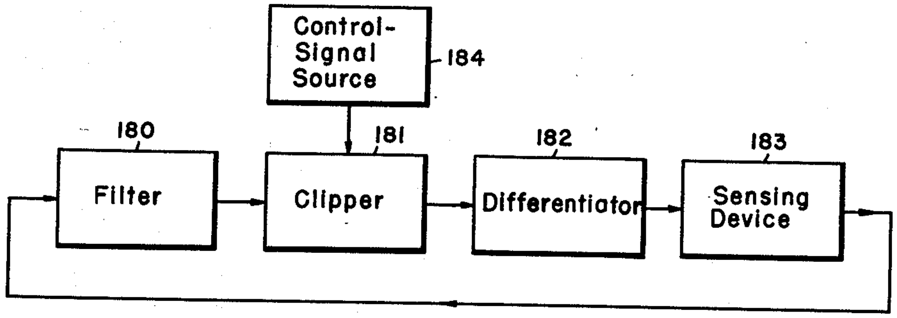
Figure 8 is a block diagram showing in simplified form the frequency controllable oscillating system of the apparatus of Figure 5, and Figures 9 and 10 are schematic diagrams of other embodiments of the invention.
Figure 9:
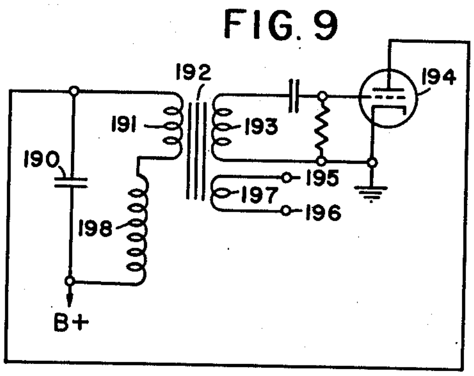
Figure 10:
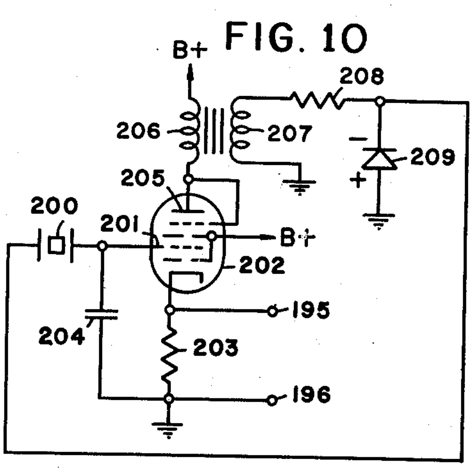

Other frequency controllable oscillating systems of the type illustrated in block diagram form in Figure 8 are shown schematically in Figures 9 and 10. In the embodiment of Figure 9, a parallel-resonant circuit, comprising a condenser 199, an inductance 198 and the primary winding 191 of a transformer, is employed as a filter for developing a substantially sinusoidal signal wave. The ferromagnetic core 192 of the transformer performs a clipping function by virtue of its hysteresis properties; for that purpose, core 192 is formed of a material such as an oriented nickel-iron alloy having a step-function type magnetization characteristic. A suitable material is commercially available under the trade name Deltamax. A secondary winding 193 is also coupled to core 192, and differentiation is accomplished in a well known manner by virtue of the inductance of secondary winding 193. Secondary winding 193 is coupled to the input circuit of a grid-leak biased rectifier comprising a triode 194 which is responsive only to positive-polarity pulses. The load impedance for triode 194 is constituted by the aforementioned resonant circuit in order to complete the feedback loop. A control signal may be applied to the terminals 195 and 196 of an auxiliary winding 197 coupled to core 192. The leakage inductance of the primary winding may in practice be employed in place of a separate series inductor 198.

In operation, the sinusoidal signal current developed in primary winding 190 is converted to a substantially rectangular wave of magnetic flux in core 192 by virtue of the step-function magnetization characteristic of this core. The steep leading and trailing wavefronts of the rectangular flux wave are converted to voltage pulses of opposite polarities by the differentiating action of the inductance of secondary winding 193, and the negative-polarity pulses are rejected by the grid-leak biased rectifier including triode 194. The phase of the leading and trailing wavefronts of the rectangular wave of flux appearing in core 192 is varied in accordance with the control signal applied between terminals 195 and 196 which produces magnetic bias in the core, with the result that the phase of the differentiated pulses appearing in the input circuit of the grid-leak biased rectifier is similarly varied. As in the case of any phase-shift oscillator, such variation in phase results in a change in the operating frequency. It is of course apparent that the control signal applied between terminals 195 and 196 may be a unidirectional phase-detector output voltage, to provide an automatic-frequency-control action, or of some other nature such as an audio signal, to provide a frequency-modulated output.

In the embodiment of Figure 10, a sinusoidal signal wave developed by a piezo-electric crystal 200 is applied to the input grid 201 of an electron-discharge device 202 of the gated-beam type, such as a commercially available type 6BN6. The cathode of device 202 is returned to ground through a resistor 203, and a condenser 204 is connected between input grid 201 and ground. The anode or output electrode 205 of device 202 is connected to B+ through the primary winding 206 of an output transformer whose secondary winding 207 is coupled through a series resistor 208 to a diode or germanium rectifier 209, and rectifier 209 is coupled to piezo-electric crystal 200 to complete the feedback loop. Terminals 195 and 196 of the control-signal source are connected to the opposite terminals of resistor 203.

In operation, piezo-electric crystal 200 functions as a filter responsive to an applied periodic signal for developing a substantially sinusoidal signal wave across condenser 204, and gated-beam 202, having a step-function type transfer characteristic, serves as a clipper for converting the sinusoidal input signal to a rectangular signal wave having steep leading and trailing wavefronts. The leading and trailing wavefronts are differentiated by virtue of the inductance of secondary winding 207 to develop pulses of alternatingly opposite polarities, and the negative-polarity pulses are shunted to ground by rectifier 209, which consequently serves as a sensing device responsive only to positive-polarity pulses. The positive-polarity pulses are applied to piezo-electric crystal 200 which functions as a passive oscillatory circuit to develop the input sinusoidal signal wave.

It is apparent, then, that a frequency controllable oscillating system of the type illustrated in general form in Figure 8 may assume a variety of forms. Filter 180 may be a passive oscillatory circuit comprising lumped inductance and capacitance elements, a piezo-electric crystal, or some other form of resonating device. Clipper 181 may take the form of a deflection-control tube, an intensity-control tube having a step-function transfer characteristic, such as a gated-beam tube, or a transformer core having a step-function magnetization characteristic; each of these devices transforms the sinusoidal input wave to a rectangular signal wave, but this is not an essential characteristic of the clipper, and a simple half-wave rectifier or any other device for providing a modified signal wave having periodic abrupt changes in slope may be substituted. Similarly, any known type of differentiating device may be employed as element 182, and sensing device 183 may assume the form of a diode or a triode rectifier, or a television scanning-signal generator embodying a discharge tube with or without an associated power output stage.

In all forms of the novel frequency controllable oscillator system, application of a control signal to the clipper results in shifting the phase of the two oppositely polarized pulses at the differentiator output in opposite directions. If the feedback loop were completed without inserting the sensing device, the two phase shifts would cancel and no frequency change would occur. By discarding one of the two polarities in the translating device, the phase shift of the pulse of opposite polarity is allowed to take full effect.

Thus the present invention provides a new and improved frequency controllable oscillating system and more particularly, as a preferred embodiment, a novel synchronizing-control system for a television receiver or the like which combines several functions hitherto performed by separate receiver stages into a simple, compact, and inexpensive circuit comprising a relatively small number of elements.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A frequency controllable oscillating system comprising: a filter responsive to an applied periodic signal for developing a substantially sinusoidal signal wave; a clipper coupled to said filter for converting said sinusoidal signal wave to a modified signal wave characterized by a waveform having periodic abrupt changes in slope; a differentiating device coupled to said clipper for developing pulses of opposite polarities in response to said abrupt changes in slope; a sensing device responsive to pulses of only one of said polarities coupled to said differentiating device; means coupling said sensing device to said filter to form a closed feedback loop for sustaining continuous oscillations in said system; and means for applying a control-signal to said clipper for varying the phasing of said abrupt changes in slope to control the frequency of said oscillations.

2. A frequency controllable oscillating system comprising: a filter comprising inductance and capacitance elements responsive to an applied periodic signal for developing a substantially sinusoidal signal wave; a clipper coupled to said filter for converting said sinusoidal signal wave to a modified signal wave characterized by a waveform having periodic abrupt changes in slope; a differentiating device coupled to said clipper for developing pulses of opposite polarities in response to said abrupt changes in slope; a sensing device responsive to pulses of only one of said polarities coupled to said differentiating device; means coupling said sensing device to said filter to form a closed feedback loop for sustaining continuous oscillations in said system; and means for applying a control signal to said clipper for varying the phasing of said abrupt changes in slope to control the frequency of said oscillations.

3. A frequency controllable oscillating system comprising: a filter responsive to an applied periodic signal for developing a substantially sinusoidal signal wave; a clipper coupled to said filter for converting said sinusoidal signal wave to a substantially rectangular wave signal having periodic steep leading and trailing wavefronts; a differentiating device coupled to said clipper for developing pulses of opposite polarities in response to said leading and trailing wavefronts; a sensing device responsive to pulses of only one of said polarities coupled to said differentiating device; means coupling said sensing device to said filter to form a closed feedback loop for sustaining continuous oscillations in said system; and means for applying a control signal to said clipper for varying the phasing of said leading and trailing wavefronts to control the frequency of said oscillations.

4. A frequency controllable oscillating system comprising: a filter responsive to an applied periodic signal for developing a substantially sinusoidal signal wave; a deflection-control electron-discharge device comprising an electron gun for projecting an electron beam, a pair of electrostatic-deflection electrodes, and an output anode and an auxiliary anode effectively having transversely adjacent active portions; means for utilizing said sinusoidal signal wave to produce an alternating deflection field within said device in a direction substantially perpendicular to the direction of electron travel to cause said beam periodically to switch from one to the other of said anodes, whereby a rectangular wave signal having steep leading and trailing wavefronts is developed at said output anode; a differentiating device coupled to said output anode for developing pulses of opposite polarities in response to said leading and trailing wavefronts; a sensing device responsive to pulses of only one of said polarities coupled to said differentiating device; means coupling said sensing device to said filter to form a closed feedback loop for sustaining continuous oscillations in said system; and means for applying a control signal to said electrostatic-deflection electrodes for varying the phasing of said leading and trailing wavefronts to control the frequency of said oscillations.

5. A frequency controllable oscillating system comprising: a filter responsive to an applied periodic signal for developing a substantially sinusoidal signal wave; a deflection-control electron-discharge device comprising an electron gun for projecting an electron beam, an electrostatic-deflection system, and an output anode and an auxiliary anode effectively having transversely adjacent active portions; means for utilizing said sinusoidal signal wave to produce an alternating deflection field within said device in a direction substantially perpendicular to the direction of electron travel to cause said beam periodically to switch from one to the other of said anodes, whereby a rectangular wave signal having steep leading and trailing wavefronts is developed at said output anode; a differentiating device coupled to said output anode for developing pulses of opposite polarities in response to said leading and trailing wavefronts; a sweep generator coupled to said differentiating device and responsive to pulses of only one of said polarities for developing periodic scanning signals; means coupling said sweep generator to said filter to form a closed feedback loop for sustaining continuous oscillations in said system; and means for applying a control-signal to said electrostatic-deflection system for varying the phasing of said leading and trailing wavefronts to control the frequency of said oscillations.

6. Synchronizing-control apparatus for a television receiver comprising: a source of signals including periodic positive-polarity synchronizing-signal components of a predetermined nominal repetition frequency; a scanning-signal generator for producing periodic scanning signals; a deflection-control electron-discharge system comprising an electron gun for projecting a focused electron beam, a pair of electrostatic-deflection electrodes, and an output anode and an auxiliary anode effectively having transversely adjacent active portions; means responsive to a signal in synchronism with said scanning signals for producing within said system an alternating deflection field in a direction substantially perpendicular to the direction of electron travel to cause said beam periodically to switch from one to the other of said anodes; a second electron-discharge system comprising an electron gun for projecting a focused electron beam, a control system including an accelerating electrode having an aperture followed by a control grid, a convergent electron lens for refocusing electrons passed by said control grid, and a pair of anodes respectively having active portions on opposite sides of the path of an undeflected electron beam emerging from said electron lens; circuit means having a time constant at least as long as the period of said nominal repetition frequency coupling said source to said control grid; means responsive to a signal in synchronism with said scanning signals for producing within said second system a deflection field in a direction substantially perpendicular to the direction of electron travel; a pair of output circuits respectively coupled to said anodes for developing a balanced direct-voltage control signal; means for applying said balanced control signal between said electrostatic-deflection electrodes; and an output circuit coupled to one of said anodes of said first-mentioned system and to said scanning-signal generator to maintain said generator in synchronism with said synchronizing-signal components.

7. Synchronizing-control apparatus for a television receiver comprising: a source of signals including periodic positive-polarity synchronizing-signal components of a predetermined nominal repetition frequency; a scanning-signal generator for producing periodic scanning signals; an electron-discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid, a convergent electron lens for refocusing electrons passed by said control grid, and a pair of anodes respectively having active portions on opposite sides of the path of an undeflected electron beam emerging from said electron lens, and a second electrode system arranged transversely of the path of another portion of said sheet-like beam and including a pair of electrostatic-deflection electrodes electrically connected respectively to said anodes, and an output anode and an auxiliary anode effectively having transversely adjacent active portions; means responsive to a signal in synchronism with said scanning signals for producing within said device an alternating deflection field in a direction substantially perpendicular to the direction of electron travel; circuit means having a time constant at least as long as the period of said nominal repetition frequency coupling said source to said control grid; a pair of output circuits respectively coupled to said first-mentioned anodes for developing a balanced direct-voltage control signal; and an output circuit coupled to one of said anodes of said second system and to said scanning-signal generator to maintain said generator in synchronism with said synchronizing-signal components.

8. Synchronizing-control apparatus for a television receiver comprising: a source of signals including periodic positive-polarity synchronizing-signal components of a predetermined nominal repetition frequency; a scanning-signal generator for producing periodic scanning signals; an electron-discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid spaced from said accelerating electrode at a distance greater than the smallest transverse dimension of said slot, a convergent electron lens for refocusing electrons passed by said control grid, and a pair of anodes respectively having active portions on opposite sides of the path of an undeflected electron beam emerging from said electron lens, and a second electrode system arranged transversely of the path of another portion of said sheet-like beam and including a pair of electrostatic-deflection electrodes electrically connected respectively to said anodes, and an output anode and an auxiliary anode effectively having transversely adjacent active portions; means responsive to said scanning signals for producing within said device an alternating deflection field in a direction substantially perpendicular to the direction of electron travel; circuit means having a time constant at least as long as the period of said nominal repetition frequency coupling said source to said control grid; a pair of output circuits respectively coupled to said first-mentioned anodes for developing a balanced direct-voltage control signal; and an output circuit coupled to one of said anodes of said second system and to said scanning-signal generator to maintain said generator in synchronism with said synchronizing-signal components.

9. Synchronizing-control apparatus for a television receiver comprising: a source of signals including periodic positive-polarity synchronizing-signal components of a predetermined nominal repetition frequency; a scanning-signal generator for producing periodic scanning-signals; an electron-discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid spaced from said accelerating electrode at a distance greater than the smallest transverse dimension of said slot, a convergent electron lens for refocusing electrons passed by said control grid, and a pair of anodes respectively having active portions on opposite sides of the path of an undeflected electron beam emerging from said electron lens, and a second electrode system arranged transversely of the path of another portion of said sheet-like beam and including a pair of electrostatic-deflection electrodes electrically connected respectively to said anodes, and an output anode and an auxiliary anode effectively having transversely adjacent active portions; a magnetic-deflection coil coupled to said scanning-signal generator for producing within said device an alternating magnetic deflection field in a direction substantially parallel to said cathode; circuit means having a time constant at least as long as the period of said nominal repetition frequency coupling said source to said control grid; a pair of output circuits respectively coupled to said first-mentioned anodes for developing a balanced direct-voltage control signal; and an output circuit coupled to one of said anodes of said second system and to said scanning-signal generator to maintain said generator in synchronism with said synchronizing-signal components.

10. Synchronizing-control apparatus for a television receiver comprising: a source of signals including periodic positive-polarity synchronizing-signal components of a predetermined nominal repetition frequency; a scanning-signal generator for producing periodic scanning signals; an electron-discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid spaced from said accelerating electrode at a distance greater than the smallest transverse dimension of said slot, a convergent electron lens for refocusing electrons passed by said control grid, and a pair of anodes respectively having active portions on opposite sides of the path of an undeflected electron beam emerging from said electron lens, and a second electrode system arranged transversely of the path of another portion of said sheet-like beam and including a pair of electrostatic-deflection electrodes electrically connected respectively to said anodes, and an output anode and an auxiliary anode effectively having transversely adjacent active portions; means responsive to a signal in synchronism with said scanning signals for producing within said device an alternating deflection field in a direction substantially perpendicular to the direction of electron travel; circuit means having a time constant at least as long as the period of said nominal repetition frequency coupling said source to said control grid; a pair of output circuits respectively coupled to said first-mentioned anodes for developing a balanced direct-voltage control signal; and an output circuit including a differentiating network coupled to one of said anodes of said second system and to said scanning-signal generator to maintain said generator in synchronism with said synchronizing-signal components.

11. Synchronizing-control apparatus for a television receiver comprising: a source of signals including positive-polarity line-frequency and field-frequency synchronizing-signal components; a first scanning-signal generator for producing line-frequency scanning signals; an electron discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid spaced from said accelerating electrode at a distance greater than the smallest transverse dimension of said slot, a convergent electron lens for refocusing electrons passed by said control grid, a pair of anodes respectively having active portions on opposite sides of the path of an undeflected electron beam emerging from said electron lens, and an additional anode for collecting space electrons passing said first-mentioned anodes, and a second electrode system arranged transversely of the path of another portion of said sheet-like beam and including a pair of electrostatic-deflection electrodes electrically connected respectively to said pair of anodes, and an output anode and an auxiliary anode effectively having transversely adjacent active portions; means responsive to a signal in synchronism with said scanning signals for producing within said device an alternating deflection field in a direction substantially perpendicular to the direction of electron travel; circuit means having a time constant at least as long as the period of said field frequency coupling said source to said control grid; a pair of output circuits respectively coupled to said first-mentioned anodes for developing a balanced direct-voltage control signal; an output circuit coupled to one of said anodes of said second system and to said first scanning-signal generator to maintain said first generator in synchronism with said line-frequency synchronizing-signal components; a second scanning-signal generator for developing field-frequency scanning signals; and an output circuit coupled to said additional anode and to said second scanning-signal generator to maintain said second generator in synchronism with said field-frequency synchronizing-signal components.

12. Synchronizing-control apparatus for a television receiver comprising: a source of signals including positive-polarity line-frequency and field-frequency synchronizing-signal components; a first scanning-signal generator for producing line-frequency scanning signals; an electron-discharge device comprising an electron gun, including an elongated cathode and an accelerating electrode having a slot, for projecting a sheet-like electron beam of substantially rectangular cross-section, a first electrode system disposed across the path of a portion of said electron beam and including a control grid spaced from said accelerating electrode at a distance greater than the smallest transverse dimension of said slot, a convergent electron lens for refocusing electrons passed by said control grid, a pair of anodes respectively having active portions on opposite sides of the path of an undeflected electron beam emerging from said electron lens, and an additional anode for collecting space electrons passing said first-mentioned anodes, and a second electrode system arranged transversely of the path of another portion of said sheet-like beam and including a pair of electrostatic-deflection electrodes electrically connected respectively to said pair of anodes, and an output anode and an auxiliary anode effectively having transversely adjacent active portions; means responsive to a signal in synchronism with said scanning signals for producing within said device an alternating deflection field in a direction substantially perpendicular to the direction of electron travel; circuit means having a time constant at least as long as the period of said field-frequency coupling said source to said control grid; a pair of output circuits respectively coupled to said first-mentioned anodes for developing a balanced direct-voltage control signal; an output circuit coupled to one of said anodes of said second system and to said first scanning-signal generator to maintain said first generator in synchronism with said line-frequency synchronizing-signal components; a second scanning-signal generator for developing field-frequency scanning signals; an output circuit coupled to said additional anode; and means coupling said additional anode and said pair of anodes to said second scanning-signal generator to maintain said second generator in synchronism with said field-frequency synchronizing-signal components.

13. Synchronizing-control apparatus for a television receiver comprising: a source of signals including periodic synchronizing-signal components; a scanning-signal generator for producing periodic scanning signals; a deflection-control electron-discharge device comprising an electron gun for projecting an electron beam, an electrostatic-deflection system, and an output anode and an auxiliary anode effectively having transversely adjacent active portions; means responsive to a signal in synchronism with said scanning signals for producing within said device an alternating deflection field in a direction substantially perpendicular to the direction of electron travel to cause said beam periodically to switch from one to the other of said anodes; a phase-detector coupled to said source and to said scanning-signal generator for comparing the relative phases of said synchronizing-signal components and said scanning signals to produce a direct-voltage control signal; means for applying said control signal to said electrostatic-deflection system; and an output circuit coupled to one of said anodes and to said scanning-signal generator to maintain said generator in synchronism with said synchronizing-signal components.

14. Synchronizing-control apparatus for a television receiver comprising: a source of signals including periodic synchronizing-signal components; a scanning-signal generator for producing periodic scanning signals; a deflection-control electron-discharge device comprising an electron gun for projecting an electron beam, a pair of electrostatic-deflection electrodes, and an output anode and an auxiliary anode effectively having transversely adjacent active portions; means responsive to a signal in synchronism with said scanning signals for producing within said device an alternating deflection field in a direction substantially perpendicular to the direction of electron travel to cause said beam periodically to switch from one to the other of said anodes; a balanced phase-detector coupled to said source and to said scanning-signal generator for comparing the relative phases of said synchronizing-signal components and said scanning signals to produce a balanced direct-voltage control signal; means for applying said balanced control signal between said electrostatic-deflection electrodes; and an output circuit coupled to one of said anodes and to said scanning-signal generator to maintain said generator in synchronism with said synchronizing-signal components.

15. Synchronizing-control apparatus in a television receiver comprising: a source of signals including periodic synchronizing-signal components; a scanning-signal generator for producing periodic scanning signals; a deflection-control electron-discharge device comprising an electron gun for projecting an electron beam, a pair of electrostatic-deflection plates, and an output anode and an auxiliary anode effectively having transversely adjacent active portions; deflection-control means for producing within said device a deflection field in a direction substantially perpendicular to the direction of electron travel; means for applying a signal in synchronism with said scanning signals to said deflection-control means to cause said beam periodically to switch from one to the other of said anodes; a balanced phase-detector coupled to said source and to said scanning-signal generator for comparing the relative phases of said synchronizing-signal components and said scanning signals to produce a balanced direct-voltage control signal; means for applying said balanced control signal between said electrostatic-deflection electrodes; and an output circuit coupled to one of said anodes and to said scanning-signal generator to maintain said generator in synchronism with said synchronizing-signal components.

16. Synchronizing-control apparatus for a television receiver comprising: a source of signals including periodic synchronizing-signal components; a scanning-signal generator for producing periodic scanning signals; a deflection-control electron-discharge device comprising an electron gun for projecting an electron beam, a pair of electrostatic-deflection electrodes, and an output anode and an auxiliary anode effectively having transversely adjacent active portions; a magnetic-deflection coil for producing within said device a deflection field in a direction substantially perpendicular to the direction of electron travel; means for applying a signal in synchronism with said scanning signals to said deflection coil to cause said beam periodically to switch from one to the other of said anodes; a balanced phase-detector coupled to said source and to said scanning-signal generator for comparing the relative phases of said synchronizing-signal components and said scanning signals to produce a balanced direct-voltage control signal; means for applying said balanced control signal between said electrostatic-deflection electrodes; and an output circuit coupled to one of said anodes and to said scanning-signal generator to maintain said generator in synchronism with said synchronizing-signal components.

17. Synchronizing-control apparatus for a television receiver comprising: a source of signals including periodic synchronizing-signal components; a scanning-signal generator for producing periodic scanning signals; a deflection-control electron-discharge device comprising an electron gun for projecting an electron beam, a pair of electrostatic-deflection electrodes, and an output anode and an auxiliary anode effectively having transversely adjacent active portions; means responsive to a signal in synchronism with said scanning signals for producing within said device an alternating deflection field in a direction substantially perpendicular to the direction of electron travel to cause said beam periodically to switch from one to the other of said anodes; a balanced phase-detector coupled to said source and to said scanning-signal generator for comparing the relative phases of said synchronizing-signal components and said scanning signals to produce a balanced direct-voltage control signal; means for applying said balanced control signal between said electrostatic-deflection electrodes; and an output circuit including a differentiating network coupled to one of said anodes and to said scanning-signal generator to maintain said generator in synchronism with said synchronizing-signal components.

18. Synchronizing-control apparatus for a television receiver comprising: a source of signals including positive-polarity synchronizing-signal components of a predetermined nominal repetition frequency; a scanning-signal generator for producing periodic scanning signals; an electron-discharge device comprising an electron gun for projecting a focused electron beam, a control system including an accelerating electrode having an aperture followed by a control grid, a convergent electron lens for refocusing electrons passed by said control grid, and a pair of anodes respectively having active portions on opposite sides of the path of an undeflected electron beam emerging from said electron lens; circuit means having a time constant at least as long as the period of said nominal repetition frequency coupling said source to said control grid; reflection-control means for producing within said device a deflection field in a direction substantially perpendicular to the direction of electron travel; means for applying a signal in synchronism with said scanning signals to said deflection-control means; a pair of output circuits respectively coupled to said anodes for developing a balanced direct-voltage control signal; and a frequency-control device coupled to said output circuits and to said generator for controlling the frequency of said scanning signals in accordance with said control signal.

19. Synchronizing-control apparatus for a television receiver comprising: a source of signals including positive-polarity synchronizing-signal components of a predetermined nominal repetition frequency; a scanning-signal generator for producing periodic scanning signals; an electron-discharge device comprising an electron gun for projecting a focused electron beam, a control system including an accelerating electrode having an aperture followed by a control grid at a distance greater than the smallest transverse dimension of said aperture, a convergent electron lens for refocusing electrons passed by said control grid, and a pair of anodes respectively having active portions on opposite sides of the path of an undeflected electron beam emerging from said electron lens; circuit means having a time constant at least as long as the period of said nominal repetition frequency coupling said source to said control grid; a magnetic-deflection coil for producing within said device a deflection field in a direction substantially perpendicular to the direction of electron travel; means for applying a signal in synchronism with said scanning signals to said deflection coil; a pair of output circuits respectively coupled to said anodes for developing a balanced direct-voltage control signal; and a frequency-control device coupled to said output circuits and to said generator for controlling the frequency of said scanning signals in accordance with said control signal.

20. Synchronizing-control apparatus for a television receiver comprising: a source of signals including positive-polarity synchronizing-signal components of a predetermined nominal repetition frequency; a scanning-signal generator for producing periodic scanning signals; an electron-discharge device comprising an electron gun for projecting a focused electron beam, a control system including an accelerating electrode having an aperture followed by a control grid at a distance greater than the smallest transverse dimension of said aperture, a convergent electron lens for refocusing electrons passed by said control grid, and a pair of anodes respectively having active portions on opposite sides of the path of an undeflected electron beam emerging from said electron lens; circuit means having a time constant at least as long as the period of said nominal repetition frequency coupling said source to said control grid; deflection-control means for producing within said device a deflection field in a direction substantially perpendicular to the direction of electron travel; means for applying a signal in synchronism with said scanning signals to said deflection-control means; a pair of output circuits respectively coupled to said anodes for developing a balanced direct-voltage control signal; a frequency-control device coupled to said output circuits; and means including a differentiating network coupling said frequency-control device to said generator for controlling the frequency of said scanning signals in accordance with said control signal.

21. Synchronizing-control apparatus for a television receiver comprising: a source of signals including positive-polarity synchronizing-signal components of a predetermined nominal repetition frequency; a scanning-signal generator for producing periodic scanning signals; an electron-discharge device comprising an electron gun for projecting a focused electron beam, a control system including an accelerating electrode having an aperture followed by a control grid at a distance greater than the smallest transverse dimension of said aperture, a convergent electron lens for refocusing electrons passed by said control grid, and a pair of anodes respectively having active portions on opposite sides of the path of an undeflected electron beam emerging from said electron lens; circuit means having a time constant at least as long as the period of said nominal repetition frequency coupling said source to said control grid; deflection-control means for producing within said device a deflection field in a direction substantially perpendicular to the direction of electron travel; means for applying a signal in synchronism with said scanning signals to said deflection-control means; a pair of output circuits respectively coupled to said anodes for developing a balanced direct-voltage control signal; and a reactance-tube system coupled to said output circuits and to said generator for controlling the frequency of said scanning signals in accordance with said control signals.

22. Synchronizing-control apparatus for a television receiver comprising: a source of signals including positive-polarity line-frequency and field-frequency synchronizing-signal components; a first scanning-signal generator for producing line-frequency scanning signals; an electron-discharge device comprising an electron gun for projecting a focused electron beam, a control system including an acceleratng electrode having an aperture followed by a control grid at a distance greater than the smallest transverse dimension of said aperture, a convergent electron lens for refocusing electrons passed by said control grid, a pair of anodes respectively having active portions on opposite sides of the path of an undeflected electron beam emerging from said electron lens, and an additional anode for collecting space electrons passing said pair of anodes; circuit means having a time constant at least as long as the period of said field frequency coupling said source to said control grid; deflection-control means for producing within said device a deflection field in a direction substantially perpendicular to the direction of electron travel; means for applying a signal in synchronsm with said line-frequency scanning signals to said deflection-control means; a pair of output circuits respectively coupled to said pair of anodes for developing a balanced direct-voltage control-signal; a frequency-control device coupled to said output circuits and to said first scanning-signal generator for controlling the frequency of said line-frequency scanning signals in accordance with said control signal; an output circuit coupled to said additional anode; a second scanning-signal generator for producing field-frequency scanning signals; and means coupling said additional anode to said second scanning-signal generator to maintain said last-mentioned generator in synchronism with field-frequency synchronizing-signal components.

23. Synchronizing-control apparatus for a television receiver comprising: a source of signals including positive-polarity line-frequency and field-frequency synchronizing-signal components; a first scanning-signal generator for producing line-frequency scanning signals; a electron-discharge device comprising an electron gun for projecting a focused electron beam, a control system including an acceleratng electrode having an aperture followed by a control grid at a distance greater than the smallest transverse dimension of said aperture, a convergent electron lens for refocusing electrons passed by said control grid, a pair of anodes respectively having active portions on opposite sides of the path of an undeflected electron beam emerging from said electron lens, and an additional anode for collecting space electrons passing said pairs of anodes; circuit means having a time constant at least as long as the period of said field frequency coupling said source to said control grid; deflection-control means for producing within said electron-discharge device a deflection field in a direction substantially perpendicular to the direction of electron travel; means for applying a signal in synchronism with said line-frequency scanning signals to said deflection-control means; a pair of output circuits respectively coupled to said pair of anodes for developing a balanced direct-voltage control signal; a frequency-control device coupled to said output circuits and to said first scanning-signal generator for controlling the frequency of said line-frequency scanning signals in accordance with said control signal; an output circuit coupled to said additional anode; a second scanning-signal generator for producing field-frequency scanning signals; and means coupling said pair of anodes and said additional anode to said second generator to maintain said second generator in synchronism with said field-frequency synchronizing-signal components.

24. A frequency controllable oscillating system comprising a filter responsive to an applied periodic signal for developing a substantially sinusoidal signal wave; means including a clipper coupled to said filter, said clipper having a clipping level which is variable in response to an applied control signal, for converting said sinusoidal signal wave to a modified signal wave including periodic pulses of predetermined polarity having a phase relation, with respect to said sinusoidal signal wave, determined by said clipping level; means coupled to said signal-converting means and responsive to said pulses of predetermined polarity for developing a periodic output signal; means couplng said last-mentioned means to said filter to form a closed feedback loop for sustaining continuous oscillations in said system; and means for applying a control signal to said clipper for varying said phase relation to control the frequency of said oscillations.

25. In a frequency controllable oscillating system of the type comprising a feedback loop having sufficient amplification to sustain continuous oscillation: a clipper included in said feedback loop and having a clipping level which is variable in response to an applied control signal; a control-signal source; and means coupled to said source for applying said control signal to said clipper to vary its clipping level, thereby varying the total phase shift effected by said feedback circuit and controlling the frequency of said oscillation.

References Cited in the file of this patent

UNITED STATES PATENTS

| Number | Name | Date |
|---|---|---|
| 2,313,209 | Valensi | Mar. 9, 1943 |
| 2,398,641 | Homrighous | Apr. 16, 1946 |
| 2,399,431 | Artzt | Apr. 30, 1946 |
| 2,580,672 | Graham | Jan. 1, 1952 |